(12) United States Patent
Matsuda

(10) Patent No.: US 11,215,244 B2
(45) Date of Patent: Jan. 4, 2022

(54) VEHICLE

(71) Applicant: KAWASAKI JUKOGYO KABUSHIKI KAISHA, Kobe (JP)

(72) Inventor: Yoshimoto Matsuda, Kobe (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 0 days.

(21) Appl. No.: 16/496,069

(22) PCT Filed: Feb. 28, 2018

(86) PCT No.: PCT/JP2018/007594
§ 371 (c)(1),
(2) Date: Sep. 20, 2019

(87) PCT Pub. No.: WO2018/173671
PCT Pub. Date: Sep. 27, 2018

(65) Prior Publication Data
US 2020/0292015 A1   Sep. 17, 2020

(30) Foreign Application Priority Data

Mar. 22, 2017 (JP) .............................. JP2017-055804

(51) Int. Cl.
*B60W 30/19* (2012.01)
*F16D 48/06* (2006.01)
(Continued)

(52) U.S. Cl.
CPC ............. *F16D 48/06* (2013.01); *B60W 10/02* (2013.01); *B60W 10/06* (2013.01); *B60W 10/10* (2013.01);
(Continued)

(58) Field of Classification Search
CPC . Y10T 477/75; Y10T 477/78; Y10T 477/638; Y10T 477/6808; Y10T 477/755;
(Continued)

(56) References Cited

U.S. PATENT DOCUMENTS 3,752,282 A * 8/1973 Espenshied ............. F16D 48/02
192/85.57
5,135,091 A * 8/1992 Albers ..................... F16D 48/04
192/83
(Continued)

FOREIGN PATENT DOCUMENTS

DE   102012208949 A1   12/2013
EP        1460317 A2    9/2004
(Continued)

*Primary Examiner* — Roger L Pang
(74) *Attorney, Agent, or Firm* — Alleman Hall Creasman & Tuttle LLP

(57) ABSTRACT

A vehicle includes: a transmission including an input shaft that receives power inputted from a power source for travel of the vehicle and an output shaft that outputs power to a drive wheel; a manual gear shifting power transmission mechanism that delivers an operation force of a driver as gear shifting power to the transmission; a clutch disposed between the power source for travel of the vehicle and the input shaft; and a controlled clutch actuation power transmission mechanism that delivers power of a clutch actuator as clutch actuation power to the clutch.

15 Claims, 7 Drawing Sheets

(51) Int. Cl.
*B60W 10/02* (2006.01)
*B60W 10/10* (2012.01)
*B60W 10/06* (2006.01)
*B60W 20/40* (2016.01)
*B60K 17/02* (2006.01)
*B60K 17/06* (2006.01)
*F16D 125/02* (2012.01)
*B60K 6/48* (2007.10)

(52) U.S. Cl.
CPC ............ *B60W 20/40* (2013.01); *B60W 30/19* (2013.01); *B60K 17/02* (2013.01); *B60K 17/06* (2013.01); *B60K 2006/4825* (2013.01); *F16D 2125/023* (2013.01); *F16D 2300/18* (2013.01); *F16D 2500/1026* (2013.01); *F16D 2500/1082* (2013.01); *F16D 2500/3067* (2013.01); *F16D 2500/30406* (2013.01); *F16D 2500/30408* (2013.01); *F16D 2500/30415* (2013.01); *F16D 2500/3115* (2013.01)

(58) Field of Classification Search
CPC ..... Y10T 477/26; B60W 30/19; B60W 10/06; B60W 10/02; B60W 10/10; B60W 20/40; F16D 48/06; F16D 2500/30406; F16D 2125/023; F16D 2500/3115; F16D 2500/1082; F16D 2500/30415; F16D 2500/3067; F16D 2500/1026; F16D 2500/30816; F16D 2500/10412; F16D 2500/30426; F16D 2500/31466; F16D 2500/7041; B60K 2006/4825
See application file for complete search history.

(56) References Cited

U.S. PATENT DOCUMENTS

| | | | |
|---|---|---|---|
| 5,176,234 A * | 1/1993 | Reik | B60W 10/02 192/53.2 |
| 5,337,848 A * | 8/1994 | Bader | F16H 3/0915 180/65.25 |
| 5,906,256 A | 5/1999 | Hayashi et al. | |
| 6,061,619 A | 5/2000 | Schmitz et al. | |
| 6,603,214 B1 | 8/2003 | Kayano et al. | |
| 10,125,828 B2 * | 11/2018 | Buchanan | F16D 25/14 |
| 2003/0146028 A1 | 8/2003 | Kayano et al. | |
| 2004/0235615 A1 | 11/2004 | Deguchi | |
| 2008/0255738 A1 * | 10/2008 | Murayama | F02D 41/023 701/54 |
| 2009/0266671 A1 | 10/2009 | Hayakawa et al. | |
| 2009/0326771 A1 * | 12/2009 | Murayama | F16H 61/0403 701/54 |
| 2011/0040461 A1 * | 2/2011 | Wolterman | B60W 10/02 701/51 |
| 2014/0011632 A1 * | 1/2014 | Ito | B60L 50/16 477/5 |
| 2015/0360673 A1 * | 12/2015 | Yoshida | B60W 10/02 477/5 |
| 2016/0377176 A1 * | 12/2016 | Bur | F16H 63/50 477/107 |
| 2018/0236866 A1 * | 8/2018 | Paterno | B60K 6/52 |

FOREIGN PATENT DOCUMENTS

| | | |
|---|---|---|
| JP | H9269019 A | 10/1997 |
| JP | 2000324610 A | 11/2000 |
| JP | 2001050379 A | 2/2001 |
| JP | 2004076897 A | 3/2004 |
| JP | 2004340294 A | 12/2004 |
| JP | 2008275084 A | 11/2008 |

* cited by examiner

| | TRANSMISSION | CLUTCH | ENGINE | MOTOR |
|---|---|---|---|---|
| ENGINE-MOTOR-DRIVEN TRAVEL MODE | ENGAGED (FIRST TO SIXTH GEAR POSITIONS) | ENGAGED (CONNECTION) | OPERATED FOR TRAVEL | OPERATED FOR TRAVEL (REGENERATION) |
| ENGINE-DRIVEN TRAVEL MODE | ENGAGED (FIRST TO SIXTH GEAR POSITIONS) | ENGAGED (CONNECTION) | OPERATED FOR TRAVEL | FREE RUN (REGENERATION) |
| ELECTRICITY GENERATION MODE | DISENGAGED (NEUTRAL) | ENGAGED (CONNECTION) | OPERATED FOR ELECTRICITY GENERATION | GENERATING ELECTRICITY |
| MOTOR-DRIVEN TRAVEL MODE | ENGAGED (FIRST TO SIXTH GEAR POSITIONS) | DISENGAGED (DISCONNECTION) | STOPPED | OPERATED FOR TRAVEL (REGENERATION) |

Fig.3

| | TRANSMISSION | CLUTCH | ENGINE | MOTOR |
|---|---|---|---|---|
| ENGINE-MOTOR-DRIVEN TRAVEL MODE | ENGAGED | ENGAGED | OPERATED FOR TRAVEL | OPERATED FOR TRAVEL (REGENERATION) |
| ENGINE-DRIVEN TRAVEL MODE | ENGAGED | ENGAGED | OPERATED FOR TRAVEL | FREE RUN (REGENERATION) |
| ELECTRICITY GENERATION MODE | DISENGAGED | DISENGAGED | OPERATED FOR ELECTRICITY GENERATION | GENERATING ELECTRICITY |

Fig.6

VEHICLE

TECHNICAL FIELD

The present invention relates to a vehicle equipped with a transmission and a clutch.

BACKGROUND ART

Patent Literature 1 discloses a gear-shifting transmission structure aimed at simplifying gear shifting operations.

CITATION LIST

Patent Literature

Patent Literature 1: Japanese Laid-Open Patent Application Publication No. 2004-340294

SUMMARY OF INVENTION

Technical Problem

Depending on the situation, however, the gear ratio may differ from that desired by the driver, or the response of the gear shifting process may be delayed.

It is therefore an object of the present invention to ensure good accuracy and response of a gear shifting process performed upon the driver's request and at the same time increase the driver-friendliness of switching of the state of power transmission.

Solution to Problem

A vehicle according to an aspect of the present invention includes: a transmission including an input shaft that receives power inputted from a power source for travel of the vehicle and an output shaft that outputs power to a drive wheel; a manual gear shifting power transmission mechanism that delivers an operation force of a driver as gear shifting power to the transmission; a clutch disposed between the power source for travel of the vehicle and the input shaft; and a controlled clutch actuation power transmission mechanism that delivers power of a clutch actuator as clutch actuation power to the clutch.

With this configuration, the transmission can be actuated by an operation force of the driver to perform a gear shifting process, and thus enables the driver to easily accomplish his/her desired gear shifting operation. Additionally, the state of power transmission can be switched through clutch actuation induced by the clutch actuator without the need for any operation force of the driver. Thus, it is possible to ensure good accuracy and response of a gear shifting process performed upon the driver's request and at the same time increase the driver-friendliness of switching of the state of power transmission.

The vehicle may further include a manual clutch actuation power transmission mechanism that delivers an operation force of the driver as clutch actuation power to the clutch.

With this configuration, the clutch can be actuated by an operation force of the driver in a situation that is not covered by the control logic.

The clutch actuator may include a hydraulic pressure pump.

With this configuration, the actuation response of the clutch is increased compared to when power transmission is established by a wire.

The clutch actuator may deliver clutch actuation power to the clutch in response to a gear shifting process of the manual gear shifting power transmission mechanism.

With this configuration, a clutch operation can be assisted by a gear shifting operation.

The vehicle may further include: a sensor that detects a difference in rotational speed between an input-side rotating member rotatable in conjunction with rotation of the power source for travel of the vehicle and an output-side rotating member rotatable in conjunction with rotation of the drive wheel; and a controller that controls the clutch actuator based on an output from the sensor and that causes the clutch to be actuated via the controlled clutch actuation power transmission mechanism.

With this configuration, the actuation timing of the clutch can be set according to the difference in rotational speed, and actuation of the clutch at appropriate timings can easily be achieved.

The vehicle may further include: a sensor that detects a difference in rotational speed between an input-side rotating member rotatable in conjunction with rotation of the power source for travel of the vehicle and an output-side rotating member rotatable in conjunction with rotation of the drive wheel; and a controller that controls the power source for travel of the vehicle based on an output from the sensor in such a manner as to reduce the difference in rotational speed between the input-side rotating member and the output-side rotating member.

With this configuration, shock caused by clutch connection is reduced, and smooth gear shifting operations can easily be performed.

Advantageous Effects of Invention

The present invention makes it possible to ensure good accuracy and response of a gear shifting process performed upon the driver's request and at the same time increase the driver-friendliness of switching of the state of power transmission.

BRIEF DESCRIPTION OF DRAWINGS

FIG. 3 is a table illustrating the respective states of a transmission, a clutch, an engine, and an electric motor of the vehicle of FIG. 1 in different modes.

FIG. 6 is a table illustrating the respective states of a transmission, a clutch, an engine, and an electric motor of the vehicle of FIG. 5 in different modes.

DESCRIPTION OF EMBODIMENTS

Hereinafter, embodiments will be described with reference to the drawings.

First Embodiment

Figure 1:
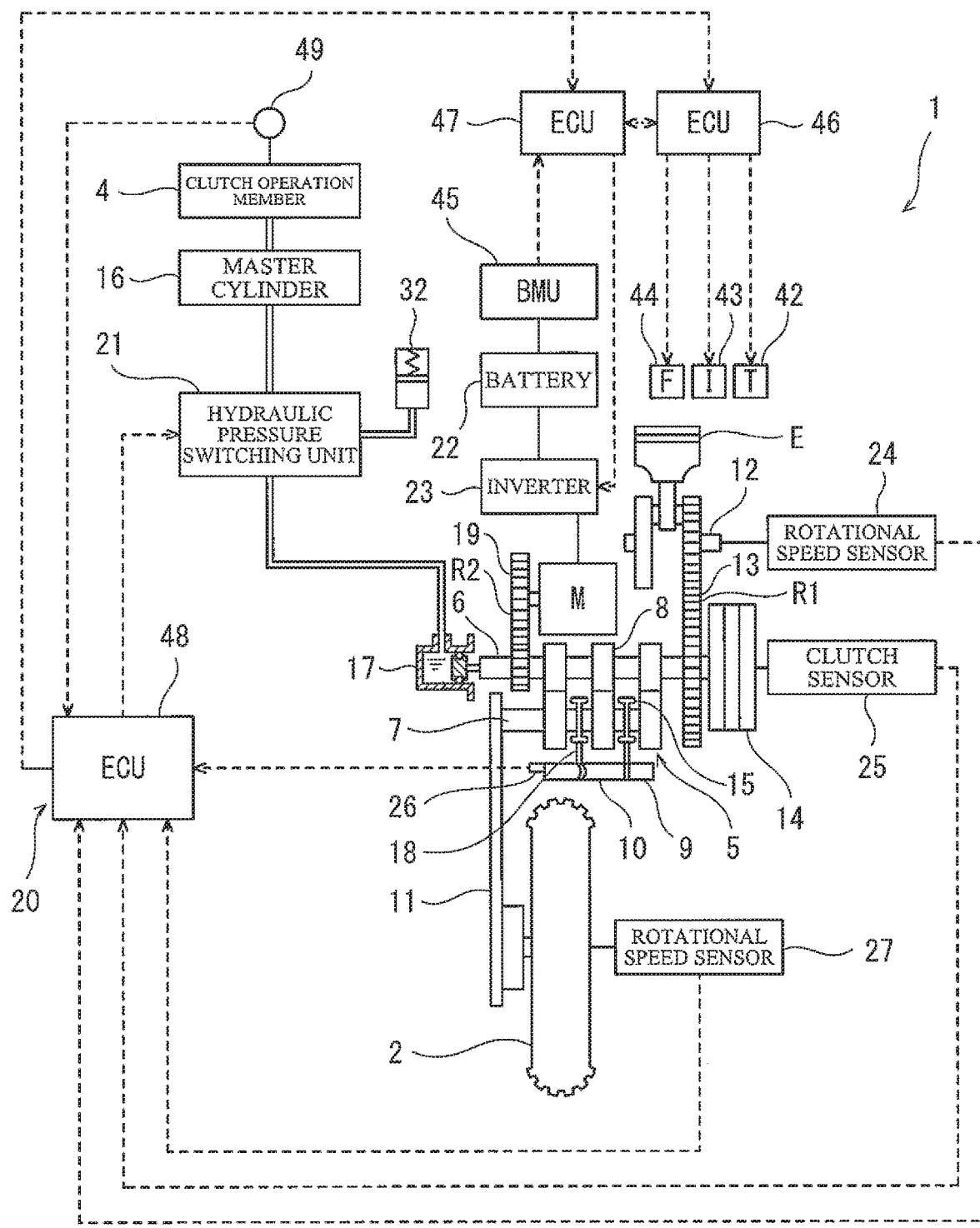
FIG. 1 is a block diagram of a vehicle according to a first embodiment.

FIG. 1 is a block diagram of a vehicle 1 according to an embodiment. As shown in FIG. 1, the vehicle 1 is, for example, a motorcycle. The vehicle 1 includes an unillustrated driven wheel (front wheel) and a drive wheel 2 (rear wheel). The handle of the vehicle 1 includes a grip 3 (see FIG. 2) equipped with a clutch operation member 4 (e.g., a clutch lever). Switches for allowing the driver to select any of the modes described later are provided in the vicinity of the handle or a meter display.

The vehicle 1 includes an engine E (internal combustion engine) serving as a drive source for travel and as a drive source for electricity generation and further includes an electric motor M serving as a drive source for travel and as an electricity generator. The engine E and the electric motor M are disposed between the driven wheel which is the front wheel and the drive wheel 3 which is the rear wheel. The cylinder of the engine E extends in an upward/downward direction, and the electric motor M is disposed behind the cylinder of the engine E.

The vehicle 1 includes a transmission 5 that provides a conversion from power received from the engine E and/or electric motor M and that transmits the converted power to the drive wheel 2. The transmission 5 is housed in a crankcase disposed below the cylinder of the engine E, and the electric motor M is disposed above the crankcase. The transmission 5 includes an input shaft 6 and an output shaft 7. The input shaft 6 receives power inputted from the engine E and electric motor M. The output shaft 7 transmits power to the drive wheel 2 via an output power transmission mechanism 11 (e.g., a chain or a belt). The input shaft 6 is coupled to the output shaft 7 via a plurality of gear trains 8 having different reduction gear ratios so that power can be transmitted from the input shaft 6 to the output shaft 7. The input-side gears of the gear trains 8 are fixed to the input shaft 6. The output-side gears of the gear trains 8 are provided coaxially with the output shaft 7 and are rotatably fitted on the output shaft 7. The input-side gears and the output-side gears are constantly in mesh.

The transmission 5 includes a manual gear shifting power transmission mechanism 9 that is mechanically associated with manual operations by the driver and that selects one of the plurality of gear trains 8 to switch the power transmission route from one to another and accomplish gear shifting. The manual gear shifting power transmission mechanism 9 selects one power transmission route from among a neutral position and a plurality of gear positions (e.g., first to sixth gear positions). The manual gear shifting power transmission mechanism 9 includes: dog rings 15 that are slidably mounted on the output shaft 7 and that each engage with a selected one of the plurality of gear trains 8; shift forks 18 that control engagement/disengagement of the dog rings 15; and a shift drum 10 that causes the shift forks 18 to move along the output shaft 7.

Upon the shift drum 10 being rotated in conjunction with an operation of a shift operation member (not illustrated) by the driver, a desired one of the shift forks 18 causes the corresponding dog ring 15 to slide along the output shaft 7 and engage with one of the gear trains 8 that has a reduction gear ratio desired by the driver. Thus, a power transmission route with a desired gear position is selected. The shift operation member is, for example, a shift pedal operated by a foot of the driver or a shift lever operated by a hand of the driver.

The transmission 5 has a neutral position where the shift drum 10 is kept stopped, and the neutral position is set as a position where the dog rings 15 are so arranged that no power is transmitted from the input shaft 6 to the output shaft 7 in a natural state where no power is applied by the driver. The driver can achieve non-transmission of power in the natural state by using the transmission 5, in particular by rotating the shift drum 10 to the neutral position provided in addition to the other gear positions.

The engine E includes a crankshaft 12 connected to the input shaft 6 of the transmission 5 via a first power transmission mechanism 13 (e.g., a gear) and a clutch 14 (e.g., a multi-plate clutch) so that power can be transmitted from the crankshaft 12 to the input shaft 6. That is, the clutch 14 is disposed in a first power transmission route R1 between the engine E and the input shaft 6. The clutch operation member 4 is, for example, a clutch lever operated by a hand of the driver or a clutch pedal operated by a foot of the driver. Once the clutch operation member 4 is moved to an operative position, the operation force applied by the driver is transmitted from a master cylinder 16 to a slave cylinder 17, from which the force is delivered as clutch actuation power to the clutch 14 via a rod inserted in the input shaft 6. As a result, the clutch 14 is brought into a disconnection state. When the clutch operation member 4 is in an inoperative position, no clutch actuation power is delivered to the clutch 14, or clutch actuation power is delivered to the clutch 14 through control of a hydraulic pressure switching unit 21 described later and, as a result, the clutch 14 is brought into a connection state. The handle is provided with a clutch operation sensor 49 that detects whether the clutch operation member 4 is in an operative state or inoperative state.

The electric motor M is connected to the input shaft 6 of the transmission 5 via a second power transmission mechanism 19 (e.g., a gear). That is, the electric motor M is connected to the input shaft 6 through a second power transmission route R2 different from the first power transmission route 13. The second power transmission route R2 allows the state of connection between the electric motor M and the input shaft 6 to be constantly kept in a power transmission state. The electric motor M can generate power from electricity supplied from a battery 22 via an inverter 23, and also generate electricity from power transmitted from the input shaft 6 of the transmission 5 to charge the battery 22 with the generated electricity.

The crankshaft 12 of the engine E is equipped with an engine rotational speed sensor 24 (e.g., a crank angle sensor) capable of detecting the rotational speed of the crankshaft 12. The clutch 14 is equipped with a clutch sensor 25 (e.g., a stroke sensor) capable of detecting whether the clutch 14 is in a disconnection state or a connection state. The transmission 5 is equipped with a transmission sensor 26 capable of detecting the shift position of the manual gear shifting power transmission mechanism 9 (one position selected from the neutral position and the plurality of gear positions [e.g., first to sixth gear positions]) to detect a command given by the driver to shift the transmission 5. For example, the transmission sensor 26 is a potentiometer capable of detecting the rotation angle of the shift drum 10 or a gear position sensor. The drive wheel 2 is equipped with a drive wheel rotational speed sensor 27 that detects the rotational speed of the drive wheel 2.

The vehicle 1 is equipped with a controller 20. The controller 20 receives output signals from the engine rotational speed sensor 24, the clutch sensor 25, the transmission sensor 26, the drive wheel rotational speed sensor 27, and the clutch operation sensor 49. The controller 20 controls the engine E, the electric motor M, and the hydraulic pressure switching unit 21. The controller 20 includes an engine ECU 46 that controls the engine E, a motor ECU 47 that controls the electric motor M, and a hydraulic pressure ECU 48 that controls the hydraulic pressure switching unit 21. The controller 20 does not need to be constituted by the ECUs 46 to 47 separate from one another and may be configured as a single unit.

The controller 20 includes a processor, a volatile memory, a non-volatile memory, an I/O interface, etc. The processor receives information from various sensors including the engine rotational speed sensor 24, clutch sensor 25, transmission sensor 26, and drive wheel rotational speed sensor 27 through the I/O interface. The processor refers to the received information and performs processing using the volatile memory according to a program stored in the non-volatile memory, thereby controlling the engine E, the electric motor M, and the hydraulic pressure switching unit 21.

The engine ECU 46 controls the output of the engine E. For example, the engine ECU 46 controls an electronic throttle valve 42 for adjusting the amount of intake air introduced into the engine E. The engine ECU 46 informs the electronic throttle valve 42 of the target amount of intake air to adjust the output of the engine E. Additionally, the engine ECU 46 may control the ignition timing of an ignition plug 43 or the amount of fuel injected from a fuel injector 44 in order to adjust the output of the engine E.

The motor ECU 47 receives information such as the remaining charge or the voltage of the battery 22 from a battery management unit 45 responsible for management of the battery 22, and gives a command to the inverter 23 to control the operation of the electric motor M.

Figure 2:
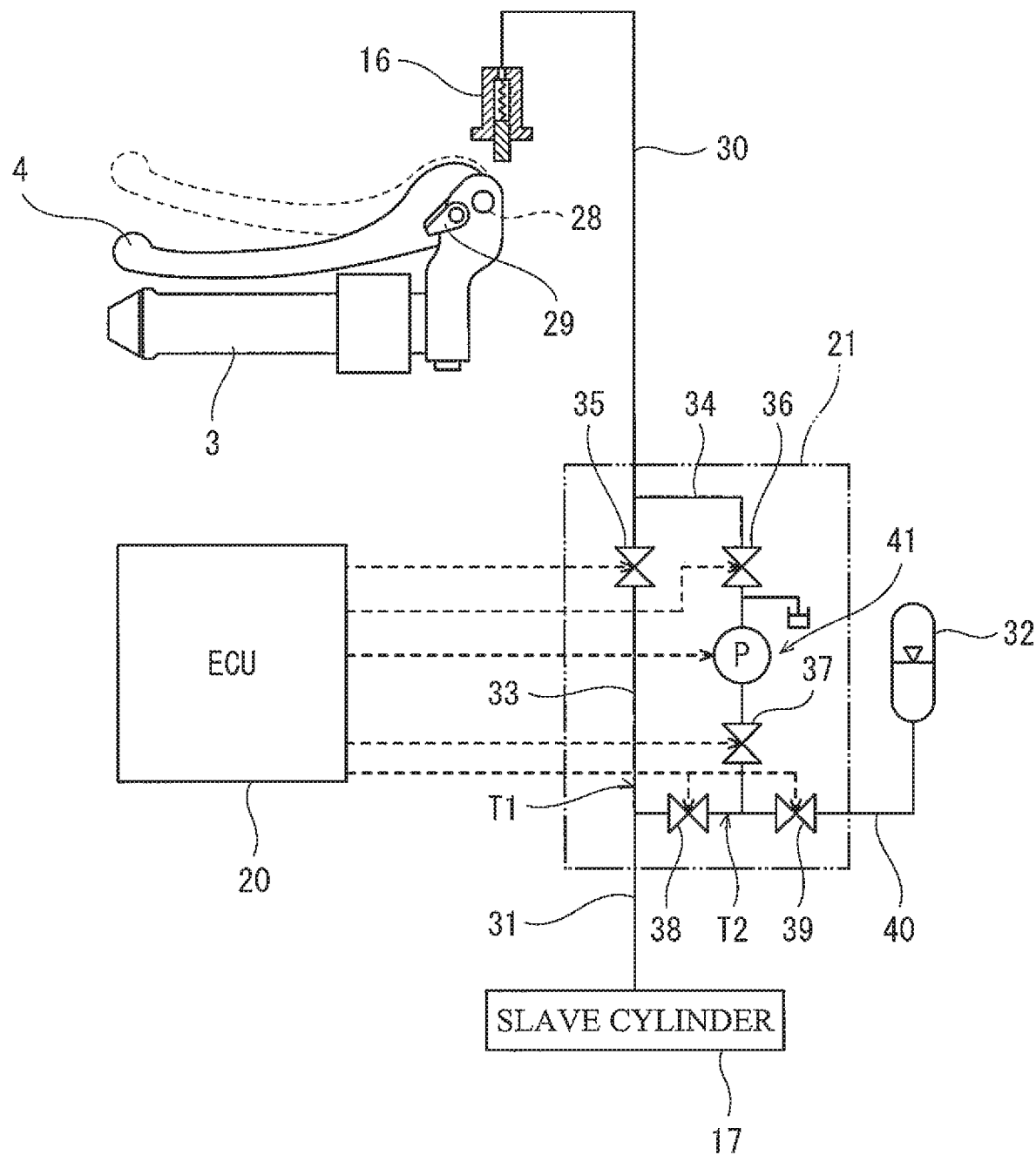
FIG. 2 is a circuit diagram including a hydraulic pressure switching unit of the vehicle of FIG. 1.

FIG. 2 is a circuit diagram including the hydraulic pressure switching unit 21 of the vehicle 1 of FIG. 1. As shown in FIG. 2, the vehicle 1 includes: a manual clutch actuation power transmission mechanism T1 that delivers an operation force of the driver as clutch actuation power to the clutch 14; and a controlled clutch actuation power transmission mechanism T2 that delivers power of a clutch actuator 41 as clutch actuation power to the clutch 14. The manual clutch actuation power transmission mechanism T1 and the controlled clutch actuation power transmission mechanism T2 are configured so that switching between the mechanisms can be made by the hydraulic pressure switching unit 21 controlled by the controller 20.

The clutch operation member 4 is provided with a biasing member 28 that biases the clutch operation member 4 from the operative position toward the inoperative position and a holding mechanism 29 configured to hold the clutch operation member 4 in the operative position. The biasing member 28 is, for example, a spring provided on a pivoting portion of the clutch operation member 4. The holding mechanism 29 is operable between a locking position and an unlocking position. Upon entering the locking position while the clutch operation member 4 is in the operative position, the holding mechanism 29 locks the clutch operation member 4 and holds the clutch operation member 4 in the operative position against the biasing member 28 without the need for the driver to operate the clutch operation member 4. Once the clutch operation member 4 enters the unlocking position, the clutch operation member 4 held in the operative position is returned to the inoperative position by the biasing member 28. For example, when the clutch operation member 4 is a clutch lever, the holding mechanism 29 may be a claw member fittable in a groove 4a of the clutch lever 4 in the operative state to lock the clutch lever 4. Once the claw member is engaged with the clutch operation member 4, the clutch lever 4 is maintained in the operative state.

In the vicinity of the clutch operation member 4 there is connected a master cylinder 16 mechanically associated with the movement of the clutch operation member 4. The master cylinder 16 receives a pressure mechanically delivered due to an operation force applied to move the clutch operation member 4 from the inoperative position to the operative position. The pressure delivered to the master cylinder 16 is transmitted to the hydraulic pressure switching unit 21 through a first hydraulic pressure pipe 30. A hydraulic pressure outputted from the hydraulic pressure switching unit 21 is delivered to the slave cylinder 17 through a second hydraulic pressure pipe 31. To the hydraulic pressure switching unit 21 is connected an accumulator 32.

The hydraulic pressure switching unit 21 includes a first hydraulic pressure passage 33 and a second hydraulic pressure passage 34 connected in parallel, and the first hydraulic pressure passage 33 and second hydraulic pressure passage 34 connect the first hydraulic pressure pipe 30 to the second hydraulic pressure pipe 31. In the first hydraulic pressure passage 33 is provided a first on-off valve 35. In the second hydraulic pressure passage 34 is provided a hydraulic pressure pump P. The hydraulic pressure pump P is driven by a motor. In the second hydraulic pressure passage 34 is provided a second on-off valve 36, which is located upstream of the hydraulic pressure pump P. To the second hydraulic pressure passage 34 is connected a third hydraulic pressure passage 40, and the connection is made downstream of the second on-off valve 36. The third hydraulic pressure passage 40 is connected to the accumulator 32. In the second hydraulic pressure passage 34 are further provided a third on-off valve 37 and a fourth on-off valve 38, the third on-off valve 37 being located between the point of connection to the third hydraulic pressure passage 40 and the hydraulic pressure pump P, the fourth on-off valve 38 being located downstream of the point of connection to the third hydraulic pressure passage 40. The clutch actuator 41 is constituted by the on-off valves 36 to 39, the hydraulic pressure pump P, and the accumulator 32. A pressure reducing valve 39 is provided in the third hydraulic pressure passage 40.

Upon determining that the driver has performed a start-up operation such as an ignition operation, the controller 20 puts the hydraulic pressure pump P into operation to increase the hydraulic pressure in the hydraulic pressure passages including the accumulator 32. When it is determined, based on a detection value obtained by a hydraulic pressure sensor (not illustrated), that the hydraulic pressure of the accumulator 32 has reached a predetermine level, the controller 20 stops the operation of the hydraulic pressure pump P. The controller 20 may be configured to, once the hydraulic pressure reaches the predetermined level, determine that the vehicle is in an operable state and permit the vehicle to start traveling.

The controller 20 causes the first on-off valve 35 to open and the second and fourth on-off valves 36 and 38 to be closed in order to perform switching to the manual clutch actuation power transmission mechanism T1 that allows a hydraulic pressure to be transmitted directly from the master cylinder 16 to the slave cylinder 17. The controller 20 causes the accumulator 32 to accumulate pressure by putting the hydraulic pressure pump P into operation while the second and fourth on-off valves 36 and 38 are closed with the third on-off valve 37 being open. The controller 20 causes the first on-off valve 35 to be closed and the second on-off valve 36 to open in order to perform switching to the controlled clutch actuation power transmission mechanism T2.

By causing the third on-off valve 37 to be closed and the fourth on-off valve 38 to open when the switching to the controlled clutch actuation power transmission mechanism T2 has been made, the controller 20 allows the hydraulic pressure accumulated in the accumulator 32 to be delivered to the slave cylinder 17, thereby bringing the clutch 14 into a disconnection state. In order to maintain the clutch 14 in the disconnection state when the switching to the controlled clutch actuation power transmission mechanism T2 has been made, the controller 20 causes the fourth on-off valve 38 to be closed. In order to bring the clutch 14 into a connection state when the switching to the controlled clutch actuation power transmission mechanism T2 has been made, the controller 20 causes the fourth on-off valve 38 and the pressure reducing valve 39 to open and thereby reduces the pressure delivered to the slave cylinder 17. When the on-off valves 35, 36, and 39 are closed and the on-off valves 37 and 38 are opened, the pressure can be directly delivered from the hydraulic pressure pump P to the slave cylinder 17.

The controller 20 is capable of executing automatic clutch control in which upon determining that a gear shifting operation has been started based on an output signal from the transmission sensor 26, the controller 20 controls the controlled clutch actuation power transmission mechanism T2 to bring the clutch 14 into the disconnection state even if the clutch operation member 4 has not been operated by the driver, and in which upon determining that the gear shifting operation has been completed based on an output signal from the transmission sensor 26, the controller 20 controls the controlled clutch actuation power transmission mechanism T2 to bring the clutch 14 back into the connection state. For example, the controller 20 executes the automatic clutch control when an automatic clutch control mode has been selected by the user. The controller 20 may execute the automatic clutch control when the connection state of the clutch 14 is detected based on an output signal from the clutch sensor 25 while a gear shifting operation is determined to have been started based on an output signal from the transmission sensor 26.

FIG. 3 is a table illustrating the respective states of the transmission 5, clutch 14, engine E, and electric motor M of the vehicle 1 of FIG. 1 in different modes. As shown in FIG. 3, the control mode of the vehicle 1 includes an engine-motor-driven travel mode, an engine-driven travel mode, an electricity generation mode, and a motor-driven travel mode. Selection from among the modes is made by the program of the controller 20 or by the user. In the engine-motor-driven travel mode, the transmission 5 is in an engaged state (non-neutral state where the transmission is in any of the first to sixth gear positions), the clutch 14 is in an engaged state (connection), the engine E is in an operating state, and the electric motor M is in an operating state. The input shaft 6 receives power transmitted both from the engine E and from the electric motor M, and the power is transmitted to the drive wheel 2. That is, the controller 20 determines that the engaged state of the transmission 5 has been detected by the transmission sensor 26 and the engaged state of the clutch 14 has been detected by the clutch sensor 25, and puts the engine E and the electric motor M into operation to allow the vehicle to travel using power of both the engine E and the electric motor M.

In the engine-driven travel mode, the transmission 5 is in an engaged state, the clutch 14 is in an engaged state, the engine E is in an operating state, and the electric motor M is in a free run state. The "free run state" refers to a state where the motor circuit is opened so as not to cause resistance due to generation of electromotive force when any power is transmitted to the electric motor M. That is, the controller 20 determines that the engaged state of the transmission 5 has been detected by the transmission sensor 26 and the engaged state of the clutch 14 has been detected by the clutch sensor 25, causes the circuit of the electric motor M to open, and puts the engine E into operation to allow the vehicle to travel using power of the engine E alone.

In the electricity generation mode, the transmission 5 is in a disengaged state (neutral state), the clutch 14 is in an engaged state, the engine E is in an operating state, and the electric motor M is in an electricity generating state. Upon satisfaction of a first electricity generation condition or a second electricity generation condition, the controller 20 causes the electric motor M to generate electricity from power transmitted from the engine E via the input shaft 6, thereby charging the battery 22.

The first electricity generation condition is that the electricity generation mode has been selected by the program of the controller 20 or by the user and the disengaged state of the transmission 5 has been detected by the transmission sensor 26. Upon satisfaction of the first electricity generation condition, the controller 20 causes the hydraulic pressure switching unit 21 to switch to the controlled clutch actuation power transmission mechanism T2 and causes the clutch actuator 41 to bring the clutch 14 into the engaged state (connection state), thereby allowing the electric motor M to generate electricity from power transmitted from the engine E via the input shaft 6 and charging the battery 22.

The second electricity generation condition is that the electricity generation mode has been selected by the program of the controller 20 or by the user, the engaged state of the transmission 5 has been detected by the transmission sensor 26, the switching of the hydraulic pressure switching unit 21 to the manual clutch actuation power transmission mechanism T1 has been detected by the controller 20, and the engaged state (connection state) of the clutch 14 has been detected by the clutch sensor 25 based on the clutch operation member 4 being held in the operative position. Upon satisfaction of the second electricity generation condition, the controller 20 causes the electric motor M to generate electricity from power transmitted from the engine E via the input shaft 6, thereby charging the battery 22.

In the motor-driven travel mode, the transmission 5 is in an engaged state, the clutch 14 is in a disengaged state (disconnection), the engine E is in a stopped state, and the electric motor M is in an operating state. Specifically, when the motor-driven travel mode has been selected by the program of the controller 20 or by the user, and the engaged state of the transmission 5 has been detected by the transmission sensor 26, and the disengaged state of the clutch 14 has been detected by the clutch sensor 25, the controller 20 puts the electric motor M into operation to allow the vehicle to travel using power of the electric motor M alone. The disengaged state of the clutch 14 may be established by causing the hydraulic pressure switching unit 21 to switch to the controlled clutch actuation power transmission mechanism T2 under control of the controller 20 and by using the hydraulic pressure of the clutch actuator 41 or may be established by holding the clutch operation member 4 in the operative position when the switching of the hydraulic pressure switching unit 21 to the manual clutch actuation power transmission mechanism T1 has been detected.

In the engine-motor-driven travel mode, the engine-driven travel mode, and the motor-driven travel mode, the inertial force of the drive wheel 2 is inputted to the electric motor M via the transmission 5 during deceleration of the vehicle 1. Thus, the controller 20 causes the electric motor M to perform regeneration to charge the battery 22 during deceleration of the vehicle 1.

In the engine-motor-driven travel mode and the engine-driven travel mode, the controller 20 calculates a difference in rotational speed between an input-side rotating member of the clutch 14 and an output-side rotating member of the clutch 14. The rotational speed of the input-side rotating member of the clutch 14 is determined by multiplying a rotational speed detected by the engine rotational speed sensor 24 by the reduction gear ratio of the first power transmission mechanism 13. The rotational speed of the output-side rotating member of the clutch 14 is determined by dividing a rotational speed detected by the drive wheel rotational speed sensor 27 by the reduction gear ratios of the second power transmission mechanism 19 and the transmission 5. That is, the difference in rotational speed between the input-side rotating member and output-side rotating member of the clutch 14 is calculated from output signals from the engine rotational speed sensor 24 and the drive wheel rotational speed sensor 27.

The controller 20 controls the electric motor M in such a manner as to reduce the difference in rotational speed between the input-side rotating member and output-side rotating member of the clutch 14. For example, when the difference in rotational speed occurs because of the rotational speed of the crankshaft 12 being higher than the rotational speed of the input shaft 6, the electric motor M is put into operation so as to increase the rotational speed of the input shaft 6. When the difference in rotational speed occurs because of the rotational speed of the crankshaft 12 being lower than the rotational speed of the input shaft 6, the electric motor M is caused to perform regeneration so as to decrease the rotational speed of the input shaft 6.

When the clutch 14 is brought into a disconnection state while switching to the controlled clutch actuation power transmission mechanism T2 has been made by the hydraulic pressure switching unit 21, the controller 20 keeps the clutch actuator 41 from bringing the clutch 14 into the connection state (namely, the disconnection state is maintained) until the difference in rotational speed between the input-side rotating member and output-side rotating member of the clutch 14 becomes lower than a predetermined level. Once the difference in rotational speed becomes lower than the predetermined level, the controller 20 causes the clutch actuator 41 to bring the clutch 14 back into the connection state.

With the configuration described above, the transmission 5 can be actuated by an operation force of the driver to perform a gear shifting process, and thus enables the driver to easily accomplish his/her desired gear shifting operation. Additionally, the state of power transmission can be switched through clutch actuation induced by the clutch actuator 41 without the need for any operation force of the driver. Thus, it is possible to ensure good accuracy and response of a gear shifting process performed upon the driver's request and at the same time increase the driver-friendliness of switching of the state of power transmission. Specifically, the timing at which the output of the engine E is delivered to the input shaft 6 can be determined by the controller 20. When the output of the electric motor M is insufficient (such as when the remaining charge of the battery 22 is small), switching to the engine-driven travel can be made by the controller 20 without the need for any operation by the driver.

Since the clutch 14 for enabling smooth gear shifting operations serves also as a device for switching of the power transmission route, size increase of the overall structure can be reduced compared to when a device for enabling smooth gear shifting operations and a device for switching of the power transmission route are provided separately. This is beneficial particularly for motorcycles having a limited space for mounting of the components.

The controller 20 can accomplish switching between motor-driven travel and engine-driven travel by controlling the hydraulic pressure switching unit 21 and causing the clutch 14 to make switching of the power transmission route. Thus, the controller 20 can switch the mode of travel based on a detected or calculated value related to the state of the vehicle.

Additionally, since the manual clutch actuation power transmission mechanism T1 is provided as well as the controlled clutch actuation power transmission mechanism T2, the clutch 14 can be actuated by an operation force of the driver in a situation that is not covered by the control logic.

Additionally, since the clutch actuator 41 includes the hydraulic pressure pump P, the actuation response of the clutch 14 is increased compared to when power transmission is established by a wire. Additionally, since the clutch actuator 41 can deliver clutch actuation power to the clutch 14 in response to a gear shifting process of the manual gear shifting power transmission mechanism 9, a clutch operation can be assisted by a gear shifting operation.

Additionally, since the clutch 14 having been in a disconnection state is brought back into a connection state by the clutch actuator 41 after the difference in rotational speed between the input-side rotating member and output-side rotating member of the clutch 14 becomes lower than a predetermined level, the actuation timing of the clutch 14 can be set according to the difference in rotational speed, and actuation of the clutch 14 at appropriate timings can easily be achieved. Additionally, since the electric motor M is controlled to reduce the difference in rotational speed between the input-side rotating member and output-side rotating member of the clutch 14, shock caused by clutch connection during gear shifting is reduced, and smooth gear shifting operations can easily be performed.

Figure 4A:
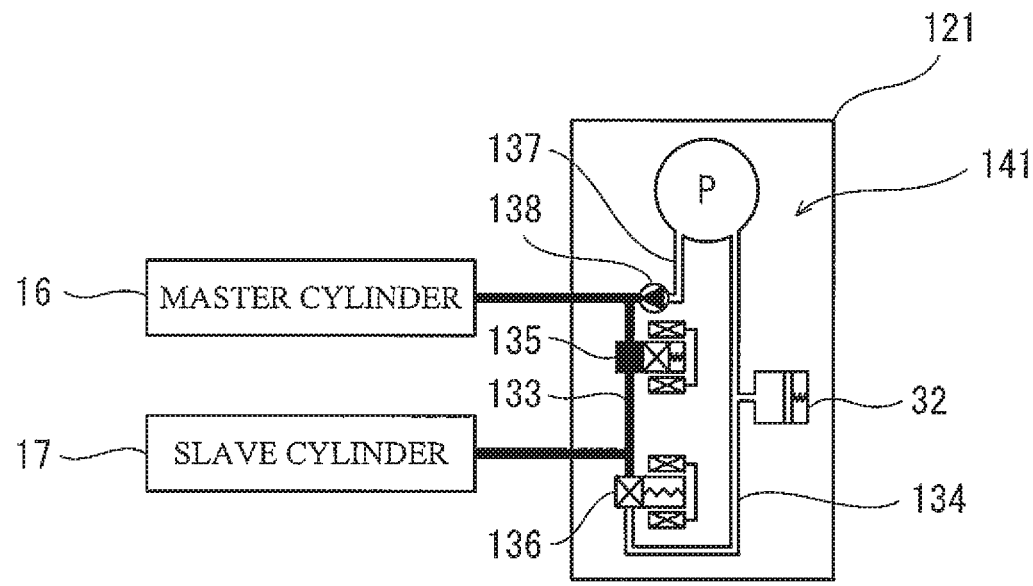
FIG. 4A is a block diagram of a hydraulic pressure switching unit according to a modified example.
Figure 4B:
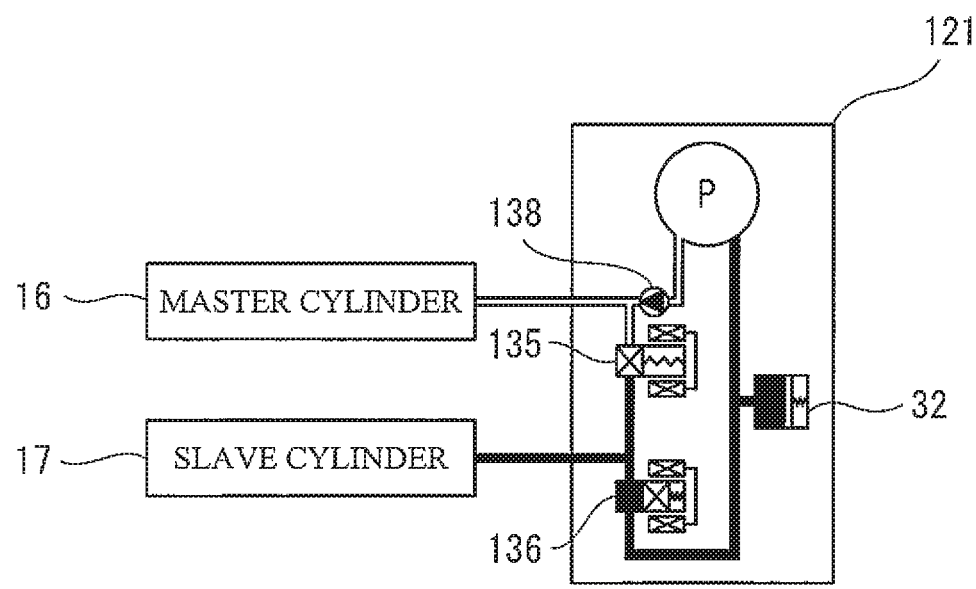
FIG. 4B is a block diagram of the hydraulic pressure switching unit of FIG. 4A.

The configuration of the hydraulic pressure switching unit 21 is not limited to that described above. For example, as shown in FIGS. 4A and 4B, a hydraulic pressure switching unit 121 according to a modified example includes a first hydraulic pressure passage 133 connecting the master cylinder 16 to the slave cylinder 17 and a second hydraulic pressure passage 134 connecting the hydraulic pressure pump P to the slave cylinder 17, the passages being connected in parallel. In the first hydraulic pressure passage 133 is provided a first on-off valve 135, while in the second hydraulic pressure passage 134 is provided a second on-off valve 136. The on-off valves are controlled by the controller. To the second hydraulic pressure passage 134 is connected the accumulator 32. The hydraulic pressure pump P and the first hydraulic pressure passage 133 are connected by a third hydraulic pressure passage 137. In the third hydraulic pressure passage 137 is provided a one-way valve 138 that blocks the flow from the master cylinder 16 to the hydraulic pressure pump P. A clutch actuator 141 is constituted by the on-off valves 135 and 136, the hydraulic pressure pump P, and the accumulator 32.

As shown in FIG. 4A, a manual clutch actuation power transmission mechanism for permitting clutch operations by the driver is implemented by causing the first on-off valve 135 to open and the second on-off valve 136 to be closed and thereby delivering hydraulic pressure to the slave cylinder 17 from the master cylinder 16. As shown in FIG. 4B, a controlled clutch actuation power transmission mechanism for permitting clutch actuation commanded by the controller 20 is implemented by causing the first on-off valve 135 to be closed and the second on-off valve 136 to open and thereby delivering hydraulic pressure to the slave cylinder 17 from the hydraulic pressure pump P and the accumulator 32.

Second Embodiment

Figure 5:
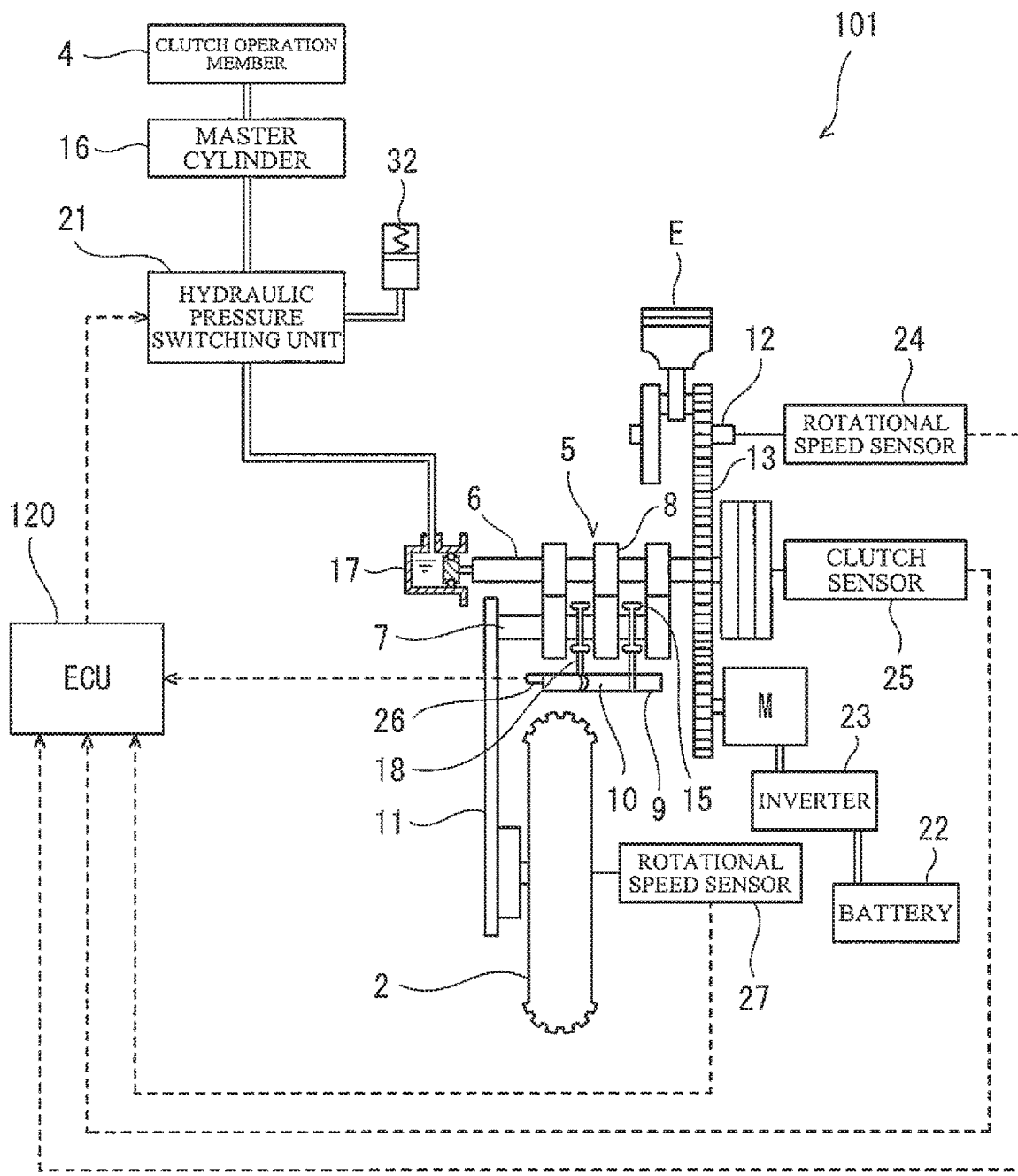
FIG. 5 is a block diagram of a vehicle according to a second embodiment.

FIG. 5 is a block diagram of a vehicle 101 according to a second embodiment. FIG. 6 is a table illustrating the respective states of the transmission 5, clutch 14, engine E, and electric motor M of the vehicle 1 of FIG. 5. In the vehicle 101 of the second embodiment, as shown in FIG. 5, the electric motor M is connected to the first power transmission mechanism 13 disposed between the engine E and the clutch 14. Thus, power of the electric motor M is transmitted to the input-side rotating member of the clutch 14 even when the clutch 14 is in a disconnection state. The control mode executed by a controller 120 of the vehicle 101 includes an engine-motor-driven travel mode, an engine-driven travel mode, and an electricity generation mode.

As shown in FIG. 6, the engine-motor-driven travel mode and the engine-driven travel mode are the same as those of the first embodiment and will therefore not be described in detail. In the electricity generation mode, the electric motor M is caused to generate electricity from power transmitted from the engine E via the first power transmission mechanism 13, and the battery 22 is charged with the thus generated electricity. During this mode, at least one of the transmission 5 and the clutch 14 is in a disengaged state. That is, when the transmission 5 is in an engaged state, the clutch 14 may be either in an engaged state or in a disengaged state, and when the clutch 14 is in an engaged state, the transmission 5 may be either in an engaged state or in a disengaged state. The other features are the same as those of the first embodiment and will therefore not be described again.

Third Embodiment

Figure 7:
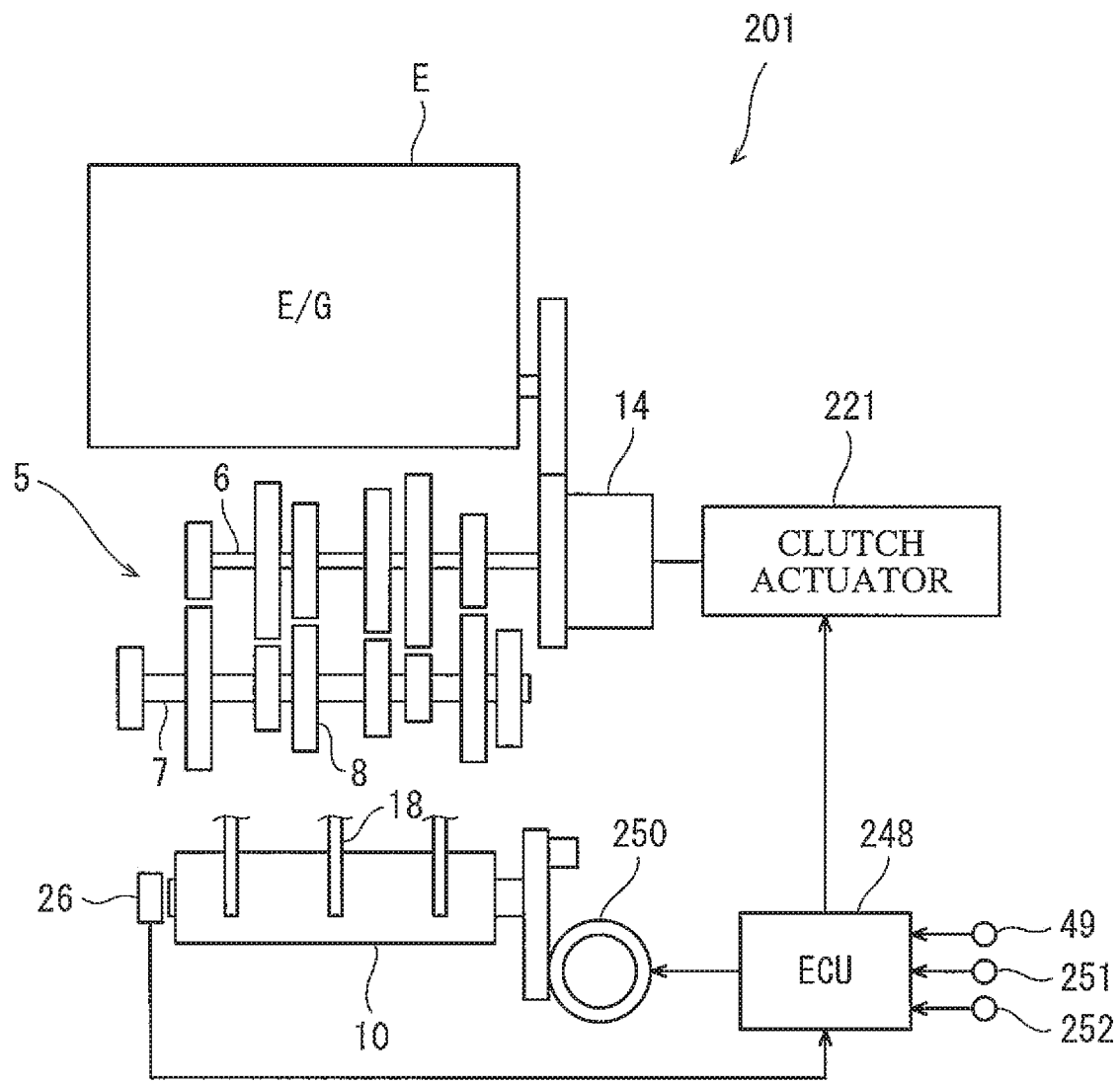
FIG. 7 is a block diagram of a vehicle according to a third embodiment.

FIG. 7 is a block diagram of a vehicle 201 according to a third embodiment. As shown in FIG. 7, the vehicle 201 is an engine vehicle incorporating only the engine E as a drive source for travel and incorporating no electric motor serving as a drive source for travel. In the vehicle 201, a shift actuator 250 (e.g., an electric motor) is connected to the shift drum 10 of the transmission 5. To the clutch 14 disposed between the engine E and the transmission 5 there is connected a clutch actuator 221 configured to switch the clutch 14 between a connection state and a disconnection state. The clutch actuator 221 may be a hydraulic pressure actuator like the controlled clutch actuation power transmission mechanism of the first embodiment or may be an electromagnetic actuator.

To the clutch actuator 221 and the shift actuator 250 is connected a gear shifting ECU 248. To the gear shifting ECU 248 are connected the clutch operation sensor 49, a gear shifting input device 251, and a gear shifting mode input device 252. The gear shifting input device 251 and the gear shifting mode input device 252 are devices (e.g., buttons) operable by a finger of the driver. The gear shifting input device 251 is used when the driver performs gear shifting using his/her finger without operating a shift lever by his/her foot. The gear shifting mode input device 252 is used when the driver performs switching between a semi-AT mode and an MT mode. A normal AT mode may be provided instead of the semi-AT mode.

When the clutch operation sensor 49 detects that the clutch operation member 4 (see FIG. 1) has been operated while the MT mode has been selected through the gear shifting mode input device 252, the gear shifting ECU 248 instructs the clutch actuator 221 to bring the clutch 14 into a disconnection state. That is, an operation performed on the clutch operation member 4 by the driver is converted to an electrical signal by the clutch operation sensor 49, and the clutch 14 is electronically controlled based on the electrical signal. Although in FIG. 7 the clutch actuator 221 is electronically controlled, a configuration similar to that of the first embodiment may be employed which uses the hydraulic pressure switching unit 21 which actuates the clutch 14 by means of hydraulic pressure generated by an operation force applied to the clutch operation member 4. Once the driver operates a shift lever (not illustrated) with his/her foot, the gear shifting ECU 248 instructs the clutch actuator 221 to bring the clutch 14 into a disconnection state as in the first embodiment. That is, the clutch actuator 221 is configured to perform an action to actuate the clutch according to an operation command given by the driver and an action to actuate the clutch independently of a clutch operation command given by the driver. The mechanism for allowing the driver to perform clutch operations (clutch operation power transmission mechanism) need not necessarily be provided.

When a shift-up command or a shift-down command is inputted through the gear shifting input device 251 while the semi-AT mode has been selected through the gear shifting mode input device 252, the gear shifting ECU 248 instructs the clutch actuator 221 to bring the clutch 14 into a disconnection state and also instructs the shift actuator 250 to rotationally drive the shift drum 10, thus causing the transmission 5 to perform a gear shifting process. That is, the gear shifting power for inducing the rotation of the shift drum 10 of the transmission 5 may be given as a force applied by the driver or as a force applied by a controlled actuator. The clutch actuator 221 may be configured to be controlled based on the degree of accelerator operation by the driver, the throttle valve position, the vehicle velocity, the engine rotational speed, and/or values detected by various sensors such as a shift position sensor.

The present invention is not limited to the embodiments described above, and an element may be modified, added, or omitted. For example, a controlled gear shifting power transmission mechanism that delivers power of a gear shifting actuator as gear shifting power to the transmission 5 may be provided in addition to the manual gear shifting power transmission mechanism 9 which delivers an operation force of the driver as gear shifting power to the transmission 5. In this case, once it is determined based on an output signal from a battery remaining charge sensor that the remaining charge of the battery 22 is equal to or lower than a predetermined level, the transmission 5 may be brought into an engaged state by the controlled gear shifting power transmission mechanism and at the same time the clutch 14 may be brought into an engaged state by the controlled clutch actuation power transmission mechanism to cause the electric motor M to generate electricity from power transmitted to the electric motor M from the engine E or the drive wheel 2 via the input shaft 6, thereby charging the battery 22.

The transmission sensor 26 may be a sensor that detects the motion of the shift operation member (gear shifting operation command). The clutch sensor 25 may be a sensor that detects the motion of the clutch operation member 4 (clutch actuation command). The clutch actuator 41 may be configured to apply pressure to the slave cylinder 17 directly by means of power of the hydraulic pressure pump P without the use of the accumulator 32.

The hydraulic pressure pump P is not limited to being electrically actuated and may be actuated by means of power of the engine E or electric motor M. For example, instead of the hydraulic pressure pump P, a hydraulic pressure generation source may be used that generates hydraulic pressure by reciprocating a piston using as a cam a rotating member rotationally driven by engine power. The engine E may be placed in a position where the cylinder head of the engine E faces forward and upward, and the hydraulic pressure pump P may be actuated by extracting power from a valve actuating mechanism disposed inside the cylinder head. In this case, the engine E may have an exhaust port located forward of an air-intake port in the vehicle, and power may be extracted from a cam or camshaft responsible for actuation of an exhaust valve in order to achieve improved space efficiency. The hydraulic pressure pump P may be used also as a hydraulic pressure pump for an ABS. A hydraulic pressure generation source that generates hydraulic pressure by rotating a blade provided on a rotating member driven by the engine may be used instead of the hydraulic pressure pump P. For example, a hydraulic pressure pump may be implemented by using a structure similar to that of a pump for circulation of a coolant or lubricant in the engine E.

The vehicle need not necessarily be a hybrid vehicle and may employ either the engine or the motor as a drive source for travel. The controlled clutch actuation power transmission mechanism T2 may be used as a clutch operation assistance device that assists in operating the clutch disposed between the drive source and the transmission. Specifically, when an operation of the clutch operation member by the driver is detected, pressure from the hydraulic pressure source is delivered to a hydraulic pressure passage in response to the clutch operation. This makes it possible to actuate the clutch with a force greater than that applied by the driver for the clutch operation. Additionally, clutch actuation timings can be set by the controller.

Additionally, the controller may be configured to switch the clutch to an engaged state upon determining that a gear shifting process has been completed. Further, the controller may be configured to switch the clutch to a disengaged state upon determining that the driver has performed a gear shifting operation. This can save the driver performing clutch operations and allows the driver to give more attention to other operations.

REFERENCE CHARACTERS LIST 1, 101, 201 Vehicle
2 Drive wheel
5 Transmission
6 Input shaft
7 Output shaft
9 Manual gear shifting power transmission mechanism
14 Clutch
24 Engine rotational speed sensor
27 Drive wheel rotational speed sensor
41, 221 Clutch actuator
E Engine (power source for travel)
M Electric motor (power source for travel)
P Hydraulic pressure pump
T1 Manual clutch actuation power transmission mechanism
T2 Controlled clutch actuation power transmission mechanism

The invention claimed is:
1. A vehicle comprising:
a transmission comprising an input shaft that receives power inputted from power sources for travel of the vehicle and an output shaft that outputs power to a drive wheel, the power sources including an engine and an electric motor;
a gear shifting power transmission mechanism that delivers a first operation force of a driver as gear shifting power to the transmission;
a clutch disposed between the engine and the input shaft;
a controlled clutch actuation power transmission mechanism that delivers power of a clutch actuator as clutch actuation power to the clutch;
a manual clutch actuation power transmission mechanism that delivers a second operation force of the driver as clutch actuation power to the clutch, and switches a state of power transmission of the engine and the electric motor; and
a controller that controls the clutch actuator to switch the state of power transmission of the engine and the electric motor based on a mode selected by a program or the driver.

2. The vehicle according to claim 1, wherein the clutch actuator includes a hydraulic pressure pump and an accumulator.

3. The vehicle according to claim 2, further comprising a first on-off valve, a second on-off valve, and a third on-off valve, wherein
the manual clutch actuation power transmission mechanism includes a master cylinder to which an operation force of the driver is input, and a slave cylinder which causes the clutch to be actuated by a hydraulic pressure delivered from the master cylinder,
the controlled clutch actuation power transmission mechanism includes a hydraulic pressure passage that transmits the hydraulic pressure from the master cylinder and the accumulator to the slave cylinder,
the first on-off valve is capable of blocking a transmission of the hydraulic pressure from the master cylinder to the slave cylinder,
the second on-off valve is capable of blocking a transmission of the hydraulic pressure from the hydraulic pressure pump to the slave cylinder, and
the third on-off valve is capable of blocking a transmission of the hydraulic pressure from the accumulator to the slave cylinder.

4. The vehicle according to claim 1, wherein the clutch actuator delivers clutch actuation power to the clutch in response to a gear shifting process of the gear shifting power transmission mechanism.

5. The vehicle according to claim 1, further comprising:
sensors that detect a difference in rotational speed between an input-side rotating member rotatable in conjunction with rotation of the engine and an output-side rotating member rotatable in conjunction with rotation of the drive wheel; and
a controller that controls the clutch actuator based on an output from the sensor and that causes the clutch to be actuated via the controlled clutch actuation power transmission mechanism.

6. The vehicle according to claim 1, further comprising:
sensors that detect a difference in rotational speed between an input-side rotating member rotatable in conjunction with rotation of the engine and an output-side rotating member rotatable in conjunction with rotation of the drive wheel; and
a controller that controls the electric motor based on an output from the sensors in such a manner as to reduce the difference in rotational speed between the input-side rotating member and the output-side rotating member.

7. The vehicle according to claim 1, wherein in the controlled clutch actuation power transmission mechanism, an actuation signal is provided to the clutch actuator in response to an operation command given by the driver, and the clutch is actuated by action of the clutch actuator.

8. The vehicle according to claim 2, wherein the clutch actuator delivers clutch actuation power to the clutch in response to a gear shifting process of the gear shifting power transmission mechanism.

9. The vehicle according to claim 3, wherein the clutch actuator delivers clutch actuation power to the clutch in response to a gear shifting process of the gear shifting power transmission mechanism.

10. The vehicle according to claim 2, further comprising:
sensors that detect a difference in rotational speed between an input-side rotating member rotatable in conjunction with rotation of the engine and an output-side rotating member rotatable in conjunction with rotation of the drive wheel; and
a controller that controls the clutch actuator based on an output from the sensors and that causes the clutch to be actuated via the controlled clutch actuation power transmission mechanism.

11. The vehicle according to claim 3, further comprising:
sensors that detect a difference in rotational speed between an input-side rotating member rotatable in conjunction with rotation of the engine and an output-side rotating member rotatable in conjunction with rotation of the drive wheel; and
a controller that controls the clutch actuator based on an output from the sensors and that causes the clutch to be actuated via the controlled clutch actuation power transmission mechanism.

12. The vehicle according to claim 4, further comprising:
sensors that detect a difference in rotational speed between an input-side rotating member rotatable in conjunction with rotation of the engine and an output-side rotating member rotatable in conjunction with rotation of the drive wheel; and
a controller that controls the clutch actuator based on an output from the sensors and that causes the clutch to be actuated via the controlled clutch actuation power transmission mechanism.

13. The vehicle according to claim 8, further comprising:
sensors that detect a difference in rotational speed between an input-side rotating member rotatable in conjunction with rotation of the engine and an output-side rotating member rotatable in conjunction with rotation of the drive wheel; and
a controller that controls the clutch actuator based on an output from the sensors and that causes the clutch to be actuated via the controlled clutch actuation power transmission mechanism.

14. The vehicle according to claim 9, further comprising:
sensors that detect a difference in rotational speed between an input-side rotating member rotatable in conjunction with rotation of the engine and an output-side rotating member rotatable in conjunction with rotation of the drive wheel; and
a controller that controls the clutch actuator based on an output from the sensors and that causes the clutch to be actuated via the controlled clutch actuation power transmission mechanism.

15. A vehicle comprising:
a transmission comprising an input shaft that receives power inputted from a power source for travel of the vehicle and an output shaft that outputs power to a drive wheel;
a gear shifting power transmission mechanism that delivers a first operation force of a driver as gear shifting power to the transmission;
a clutch disposed between the power source and the input shaft;
a controlled clutch actuation power transmission mechanism that delivers power of a clutch actuator as clutch actuation power to the clutch;
a manual clutch actuation power transmission mechanism that delivers a second operation force of the driver as clutch actuation power to the clutch;
sensors that detect a difference in rotational speed between an input-side rotating member rotatable in conjunction with rotation of the power source and an output-side rotating member rotatable in conjunction with rotation of the drive wheel; and
a controller that controls the power source based on an output from the sensors in such a manner as to reduce the difference in rotational speed between the input-side rotating member and the output-side rotating member, wherein
the controller controls the clutch actuator based on an output from the sensors and causes the clutch to be actuated via the controlled clutch actuation power transmission mechanism.

\* \* \* \* \*